United States Patent [19]

Allen

[11] 4,236,735

[45] Dec. 2, 1980

[54] FITMENT FOR A VESSEL

[76] Inventor: John D. Allen, 5005 Zahm Rd., Belding, Mich. 48809

[21] Appl. No.: 901,416

[22] Filed: May 1, 1978

[51] Int. Cl.³ .............................................. F16L 13/04
[52] U.S. Cl. ..................................... 285/114; 285/21; 285/158; 285/423; 285/363
[58] Field of Search ................. 285/21, 158, 192, 114, 285/423, 42, 43, 189, 328, 363; 248/174, 536

[56] References Cited

U.S. PATENT DOCUMENTS

| | | | |
|---|---|---|---|
| 2,464,487 | 3/1949 | Chappell et al. | 285/363 X |
| 2,731,225 | 1/1956 | Cayo | 248/536 |
| 2,741,402 | 3/1956 | Sayre | 285/21 |
| 2,998,986 | 9/1961 | Buono | 285/229 |
| 3,106,940 | 10/1963 | Young | 285/189 X |
| 3,436,102 | 4/1969 | Shelly | 285/21 X |

*Primary Examiner*—Dave W. Arola
*Attorney, Agent, or Firm*—Price, Heneveld, Huizenga & Cooper

[57] ABSTRACT

A fitment for mounting on a vessel or tank constructed of reinforcing filaments such as glass or other fibers located in a resin matrix. The fitment includes a platform or top wall which is generally planar and has a pair of generally opposing rectilinear sides. The platform is adapted for supplying a fitting for a hose or nozzle which can be removably attached thereto. Two legs depend from the sides of the platform. A pipe also depends from the central portion of the platform. The ends of the pipe and legs are adapted for securement to the wall of a tank or vessel by bonding resin compatible with the resin of the fitment and the tank. The fitment is preferably constructed of layers of glass fiber reinforcing materials.

13 Claims, 9 Drawing Figures

FITMENT FOR A VESSEL

BACKGROUND OF THE INVENTION

(1) Field of the Invention

This invention relates to a fitment for the application of fittings and nozzles to storage vessels; and, more particularly, to a fitment for vessels constructed of filaments in a resin matrix.

(2) Prior Art

It is known to make tanks, pipes, stacks, towers and other fluid or gas handling vessels using glass, carbon, natural or synthetic fibers wound or applied over a convex surface of a winding or forming mandrel and fixed in a resin or binding matrix. The resulting tank has high strength and superior corrosion resistance. The fibers are applied either in a continuous form in a helical or purely cylindrical winding pattern or applied in a discontinuous form in a two-dimensional random pattern. The filaments are imbedded in a hardened resin matrix. The finished tank or vessel wall with the filaments oriented to carry the stresses in the geometric patterns in which they occur provides a very strong construction at a relatively low weight when compared with metal structures. Thus, the vessel can either be made by filament winding, the term used for placing reinforcing fibers in a continuous form in either a helical or circumferential pattern or some combination of both, or by contact molding, a term referring to the placement of discontinuous fibers of the various lengths in a random pattern over the surface of a mandrel.

The load bearing capability of the vessel wall is determined by the geometry of the placement of the filaments and the methods of transferring stress along each fiber and methods of transferring stress from fiber to fiber. Nevertheless, however complex the load pattern, the interruption of the fiber pattern around any opening or nozzle for an inlet or an outlet to the vessel requires additional reinforcement around the opening. Further, in addition to the weakening of the vessel wall caused by the opening, an additional strain is placed on the wall due to additional external forces such as overhung loads and torques caused by attaching filling hoses and the like. The forces can vary due to factors such as depth of liquid, internal or external pressure, wind load, vibration loads induced by agitation and by localized loading due to the attachment of accessory items such as ladders, piping or by variable submergence. Some vessels are used as transport containers and the fiber stress becomes dependent not only on the above named factors, but also upon cargo surging and road vibration. These additional forces are often relatively large in magnitude and are transferred to the tank wall.

Fitments are used to improve the load bearing capability of the vessel wall at an opening and to facilitate attachment of connecting hoses and the like. U.S. Pat. No. 3,436,102 discloses the known prior art filaments for filament reinforced plastic tanks. One type of such fitment includes a construction in which a flange is mounted on one end of a suitable length of pipe which has the other end extending down through the vessel wall to provide connecting access to the inside of the vessel. Reinforcing gussets or radially extending braces are aligned with the axis of the pipe and are spaced 90° from one another around the periphery of the portion of the pipe which is exposed on the outside of the vessel between the vessel wall and the flanged fitting. A weld type connection is made between the pipe and the gussets along the length of the pipe. The gussets are also similarly joined by a weld type connection to the bottom side of the flange fitting and the top of the vessel wall. There is a great deal of time consuming expensive custom hand work put into connecting the flange to the pipe, the gussets to the pipe, the gussets to the bottom of the flange, and the gussets to the tank wall. Making the fitment from a plurality of parts is not only time consuming and expensive, but makes it necessary to insure that each part is securely connected. Otherwise, the failure of one connection may cause the entire fitment to fail.

Another type of fitment disclosed in U.S. Pat. No. 3,436,102 is a construction comprising a generally truncated conical wall on which is mounted a top wall for receiving the flange or pipe fitting. The top wall extends across the top of the truncated conical wall and at the bottom of the conical wall is located a flange that connects to the top surface of the tank wall. Openings are provided in the sides of the conical wall to permit attaching a pipe extending from the top wall into the interior of the tank. The fitment of U.S. Pat. No. 3,436,102 presents several problems. First, even though the openings through the sides of the conical wall are necessary for connection of the fitment, they do not provide easy access for making the connection. Additionally, the area within the conical wall serves as a dirt trap and is very difficult to clean. Further, the outwardly flaring flange on the bottom or large end of the cone makes it very difficult if not impossible to fit on curved surfaces. To do so requires a custom preformed special shape to fit the contour of the vessel, or the radially extending flange must be cut off from the fitment in order to fit it to the surface contour of the tank wall, thus weakening the fitment. Understandably, custom molding is expensive and often inconvenient.

Another disadvantage of the conical shaped support is that the conical shaped reinforcing skirt does not permit the use of woven fabric, chopped strand mat, or other commercially available reinforcement in such a fashion as to be economical to fabricate. Additionally, it cannot be made with the fibers oriented in the best geometric pattern to fully utilize their strength potential.

In addition to the previously mentioned difficulty in getting materials and tools into the interior of the cone to attach the pipe to the tank wall, it is also almost impossible to apply a fillet in the seam formed on the inside of the conical skirt where it joins the tank wall. This is a particularly unsanitary point where dirt can accumulate and also is a point for stress concentration.

Access to the interior of the conical skirt is also necessary to tighten or loosen the bolts or the nuts used to attach the mating flange of the filling hose or the like to the top plate of the fitment. In other words, the bolt which extends through the top wall or plate of the conical fitment must be held from the inside which is difficult to do with the fitment of U.S. Pat. No. 3,436,102.

In view of the closed nature of the fitment of U.S. Pat. No. 3,436,102, inspection of the workmanship in applying the fitment is very difficult. In particular, the integrity of the seal of the pipe to the tank wall is hard to inspect both at the time of manufacture and after the product is in service. Should any leakage occur at that point it is almost certain to be trapped and held in contact with the outside of the tank wall by the bottom portion of the conical skirt. This may present a health or a safety hazard. Certainly, any rain or wash water coming into the area surrounded by the conical skirt would be trapped. These are some of the problems this invention overcomes.

SUMMARY OF THE INVENTION

A fitment in accordance with an embodiment of this invention provides a substantially integral structure with trapezoidal shaped legs extending down from two opposite sides of a top wall. The legs are shaped and positioned to support the top wall at a position spaced from the vessel wall. While at the same time providing easy access to the area beneath the top wall. A pipe extends from an opening in the top wall through the wall of the vessel to provide access to the interior of the vessel.

The fitment is more easily manufactured and easier to install than those previously known. Further, the construction of this fitment more easily adapts to the typical geometry of a vessel wall at the point of attachment than those in the prior art. There is improved access to the area beneath the top wall which provides better access to bolts used for attachment of external connections, improved ease of connection of the supporting surfaces to the vessel wall, and improved ease of cleaning. As a result, the invention provides an economical fitment for an opening cut into the wall of a fiber reinforced resin structure and a fitment that keeps the stresses in the fiber structure within allowable limits.

Not only is the geometry of the fitment suitable for attaching to a tank wall at a plurality of locations, but it improves use of commercially available materials and forming techniques. More specifically, the fitment can be adapted for use with flat, simple or compound surfaces without producing an individual form for each configuration. If desired, the same resin and fiber systems employed to construct the vessel or tank wall can be used to fabricate the fitment. Thus, the fitment in the tank can be readily compatible.

As a result of the preceding, less labor is used in the installation of the fitment and the manufacture of the fitment. The easier access also makes it easier to inspect for manufacturing defects and, after it is in use, easier to inspect for possible externally imposed damage.

DETAILED DESCRIPTION OF THE INVENTION

Figure 1:
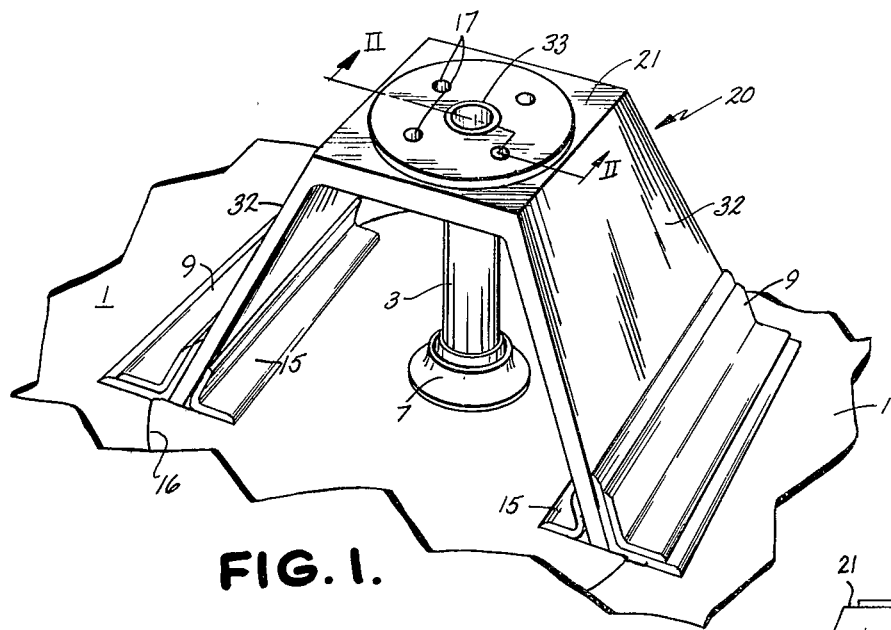
FIG. 1 is a front perspective view of a fitment in accordance with an embodiment of this invention.

Referring to FIG. 1, a fitment 20 provides a reinforced surface for sustaining a loading force and for providing a reinforced opening into the interior of a vessel or tank having a tank wall 1. For example, the flange of a hose or pipe used to fill the tank can be attached to fitment 20.

Fitment 20 includes a planar rectangular top wall 21 having integrally molded trapezoidally shaped legs 32 extending outwardly and downwardly from opposed edges thereof. Opposing interior surfaces of legs 32 diverge as they recede from top wall 21 adding stability to the fitment. Top wall 21 has a centrally positioned circular pipe opening 33 extending therethrough within which is bonded the end of a downwardly depending pipe nozzle 3. Top wall 21 has four attachment holes 17 (more if necessary) extending therethrough at the four corners at spaced locations around pipe opening 33 so a hose or pipe flange can be attached to top wall 21.

Figure 2:
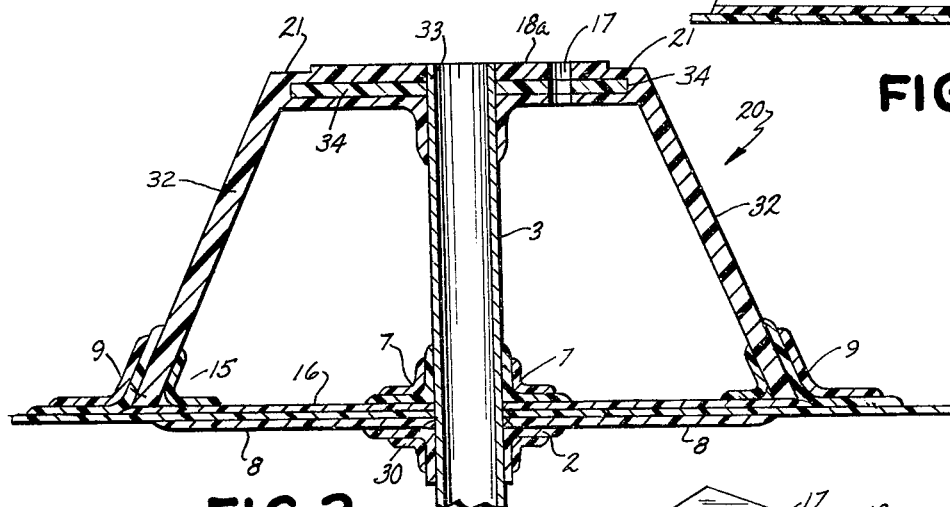
FIG. 2 is a sectional view taken generally along the planes of line II—II of FIG. 1.
Figure 4:
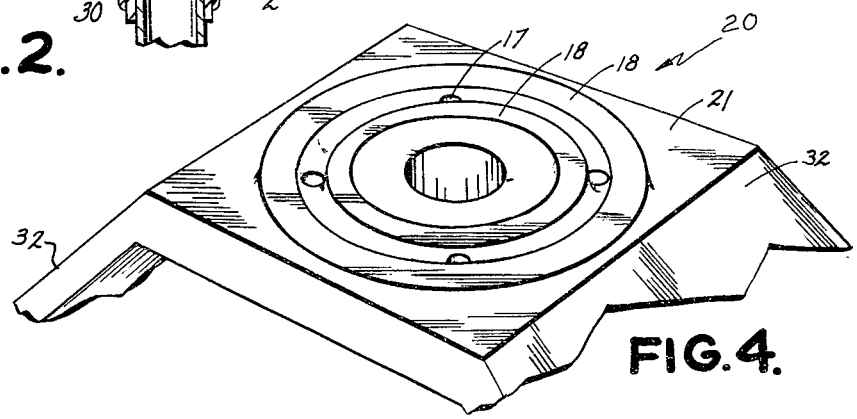
FIG. 4 is a perspective view of the top wall of a fitment in accordance with an embodiment of this invention showing raised annular rings for concentrating gasket pressure.
Figure 7:
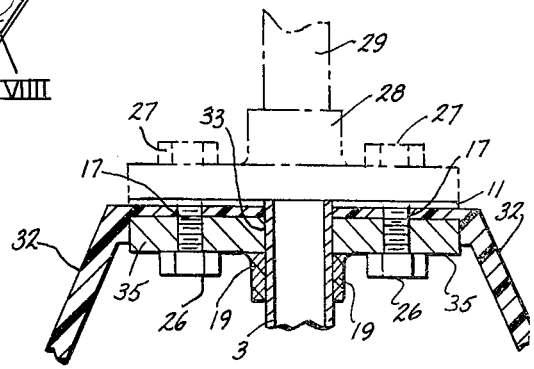
FIG. 7 is a sectional view of a fitment in accordance with an embodiment of this invention including a reinforcing flange under the top wall and dotted lines indicating the connection of a flange.

The top wall or platform 21 can take several forms as shown in FIGS. 2, 4 and 7. It can have exterior or interior reinforcement such as disclosed in FIG. 2 wherein an interior reinforcement ring 34 constructed of a molded plastic or metal is shown in cross section. Ring 34 is generally annular and is positioned between the top and bottom surfaces of top wall 21 and extends around pipe opening 33. A raised circular portion 18a surrounding pipe opening 33 and including attachment holes 17 is also provided in the embodiment of FIG. 2.

The top of fitment 20 can also include as disclosed by FIG. 7, an exterior reinforcement flange 35 constructed of plastic or metal which surrounds the upper portion of pipe nozzle 3 and abuts the bottom surface of top wall 21. Flange 35 is attached to top wall 21 by connecting bolts 26 extending through attachment holes 17 and being secured by connecting nuts 27. Fillets 19 provide a seal between flange 35 and pipe nozzle 3. Also, as disclosed in FIG. 7, the connection of a hose or pipe flange 28 is shown in dotted outline so that fluid carried by a hose 29 is in communication with pipe opening 33 and the interior of pipe nozzle 3 and can go through tank wall 1 into the tank or vessel.

Referring to FIG. 4, another embodiment of the fitment includes raised annular rings 18 formed of the same material as the remainder of the top wall and extending upwardly of the top surface of wall 21 for concentrating gasket pressure. These two annular rings are arranged with one located radially inward of attachment holes 17 and one located just radially outward of attachment holes 17. The number of rings can be varied to put the proper sealing pressure on the gasket.

A sealing gasket 11 (FIG. 7) can also be used in any of the foregoing embodiments. Gasket 11 is a generally annular member of a material such as rubber and is positioned between the upper surface of top wall 21 and the lower surface of hose or pipe flange 28. With the use of gasket 11, tightening connecting bolts 26 and nuts 27 compresses sealing gasket 11 against annular rings 18 to form a good seal between flange 28 and top wall 21.

The connection of fitment 20 to tank wall 1 includes passing the bottom portion of pipe nozzle 3 through a tank wall opening 30 (FIG. 2) and resting the bottom edges of legs 32 against the outer surface of tank wall 1. As shown in FIGS. 1 and 2, an overlay weld 9 extends over the outer lower surface of leg 32 and over the adjacent top surface of tank wall 1. Weld 9 is typically formed of a resin which is compatible with both the material of fitment 20 and tank wall 1. Pipe nozzle 3 is also welded and sealed to tank wall 1 by a weld 7 around the upper surface of tank wall 1 and the adjacent lower, outer surface of pipe nozzle 3. A weld 8 reinforces and seals pipe nozzle 3 inside tank wall 1. Analogously, a fillet 15 may also extend along the interior lower surface of legs 32 and the adjacent top of tank wall 1. Fillet 15 is advantageous for sanitary purposes to facilitate easy cleaning and to avoid a cleaning of a recessed crack and for structural attachment of fitment 20 to tank wall 1.

The welds 9, 15 and 19 are made by saturating a mat or fabric of fibrous material, generally glass, with catalyzed resin and applying it in layers over the joint, and then rolling it thoroughly to remove any entrapped air and to get it into solid bonding contact with the tank wall and the fitment.

Referring to FIG. 2, when stress conditions require, an annular reinforcement overlay 16 can be positioned on the surface of tank wall 1 so that it extends between the bottom portions of legs 32 and around pipe nozzle 3 for additonal reinforcement of the area of attachment of fitment 20 to tank wall 1. More specifically, annular reinforcement overlay 16 is a generally planar piece with an opening which is centered about tank wall opening 30 and extending radially outward sufficiently far to reach legs 32. Reinforcement overlay 16 is sandwiched between the lower ends of legs 32 and the upper portion of tank wall 1. It preferably is formed of a mat of random fibers within a resin matrix and attached to the top of tank wall 1 by resin.

FABRICATION

Fitment 20 is fabricated by positioning the filaments and resins which comprise fitment 20 in a female mold. The female mold has an interior shape corresponding to the exterior shape of fitment 20. At the bottom center of the mold is a nylon bushing which serves to position pipe nozzle 3 within the mold. After pipe nozzle 3 is positioned within the mold, various reinforcement fabrics along with resin are placed in the mold in a predetermined sequence as now will be explained.

Figure 5:
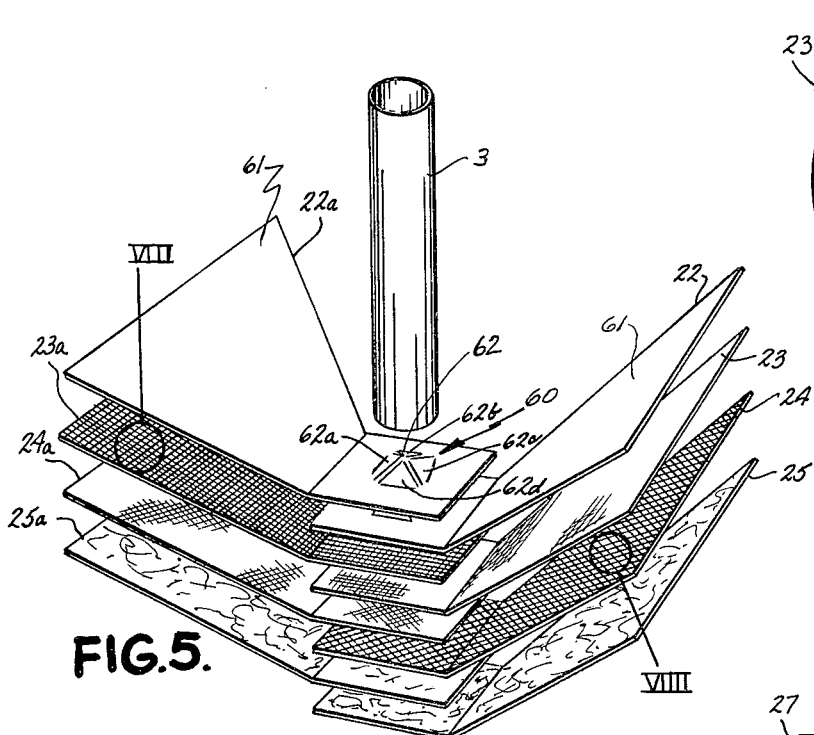
FIG. 5 is a perspective exploded view of the unassembled components of a fitment in accordance with an embodiment of this invention.

More specifically, referring to FIG. 5, it will be seen that the fitment is made up of eight or more layers 22, 22a, 23, 23a, 24, 24a, 25 and 25a. Each layer has a shape simulating half of a bow tie and thereby each includes a substantially square part or portion 60 and a trapezoidal shaped part 61 integral with and extending from one side of the part 60. The parts or portion 60 of the layers form the top wall 21. Each part 60 has a cross-cut 62 forming four flaps 61 a, b, c and d which fold back so that the layer can be slipped over pipe nozzle 3. As shown, the top wall is made up of twice the number of layers as each leg 32 and therefore the thickness of top wall 21 is approximately twice that of the thickness of each leg 32. A typical thickness for supporting legs 32 is one-half inch and a typical thicknes for top wall 21 is one inch.

The first layers to be positioned in the female mold are the surfacing veil 25 followed by surfacing veil layer 25a. Layers 25 and 25a are each constructed of strands of fiberglass filaments held together by a temporary adhesive and then later permanently secured to the other components of fitment 20 by a suitable resin. Surfacing veils 25 and 25a help improve the corrosion resistance of fitment 20 by reducing the "wicking" action of the filaments to draw corrosive fluids into fitment 20 and destroy the lamination of fitment 20. Therefore, depending upon the fluid which is to be used with fitment 20, it may not be necessary to have a surfacing veil 25. Alternatively, if only some protection is desired, a surfacing veil material may just extend over top wall 21.

Figure 8:
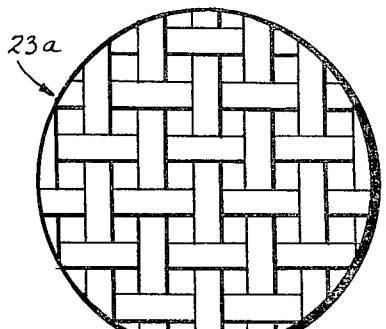
FIG. 8 is an enlarged view of a portion of a fabric with fibers at 90° angle crossing shown in FIG. 4.

After positioning surface veil layers 25 and 25a, a woven fabric layer 24 is placed in the mold. Woven fabric layers 24 and 24a also have cross-cuts (not shown) in the area of the parts 60 for fitting over pipe nozzle 3. Woven fabric layers 24 and 24a are comprised of one-quarter inch wide ribbon strips of fiberglass filaments which are woven together so that they intersect at about 90° angles and are temporarily held together by an adhesive in the woven condition (FIG. 8). The individual ribbons of fabric 24 are themselves made of hundreds of thin filaments of a material such as glass. Again, the introduction of resin into the mold permanently bonds woven fabric layers 24 and 24a to each other and to the other layers.

Figure 9:
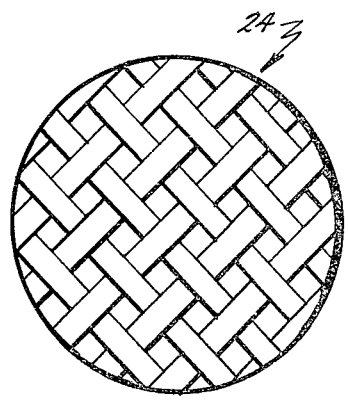
FIG. 9 is an enlarged view of a portion of a fabric with fibers at 45° angle crossing shown in FIG. 4.

After woven fabric layers 24 and 24a are in place, woven fabric layers 23 and 23a are positioned in the mold. Woven fabric layers 23 and 23a are similar to woven fabric layers 24 and 24a except that the weave is oriented 45° from other layers (FIG. 9). Layers 23 and 23a are also bonded together and to the other layers by a suitable resin. A first woven fabric 23 is positioned to cover one layer of woven fabric 24 and then a second woven fabric 23 is positioned to cover the other layer of woven fabric 24.

After woven fabric 23 is in place in the mold, the fabric or mat reinforcement layers 22 and 22a are positioned in the mold. The composition of reinforcement layers 22 and 22a are typicaly woven fabric which has a surface coated with chopped random fibers thereby creating a stronger material than the other fabrics 23, 23a, 24 and 24a. Obviously, layers 22 and 22a are also bonded to each other and the other layers by a suitable resin.

Typically, the sequence of layering woven fabrics 24, 24a, 23 and 23a and reinforcement layers 21 and 21a is repeated until the desired thickness is achieved in both the supporting legs 32 and top wall 21. The overlapping flaps of the cutout for the central pipe are resin bonded to the pipe. Advantageously, the resin is catalyzed so it is hard in about one hour and the filaments can be removed from the mold.

The mold advantageously has little nipples protruding at the position of attachment holes 17. As a result, when fitment 20 is removed from the mold, attachment holes 17 can be drilled and the position of each attachment hole 17 is readily identifiable by an indentation in top wall 21 caused by the nipples in the female mold.

For embodiments including reinforcement member or ring 24, the annular reinforcement member 34 is positioned over pipe nozzle 3 between two of the layers when top wall 21 is about half its final thickness. A typical material for interior reinforcement ring 34 is a random filament bound in a matrix. Pipe nozzle 3 can be a wound filament secured by a resin. The resin used to install a complete fitment on a tank wall 1 is typically the same as the resin which was used to bond the various fabrics 23, 24 and reinforcements 34. As a result, there is a compatability of materials and a good bonding.

Examples of the material chosen for bonding the fiberglass filaments include Dow "Derakane" (a vinyl ester), ICI "ATLAC" (a bisphenol ester), general purpose polyester, or one of several epoxies. An example of a material for joining fitment 20 to a tank wall is catalyzed polyester resin mixed with a thixotrope. However, any bonding agent compatible with tank walls, the fitment and the product to be placed in the tank can be used.

Figure 6:
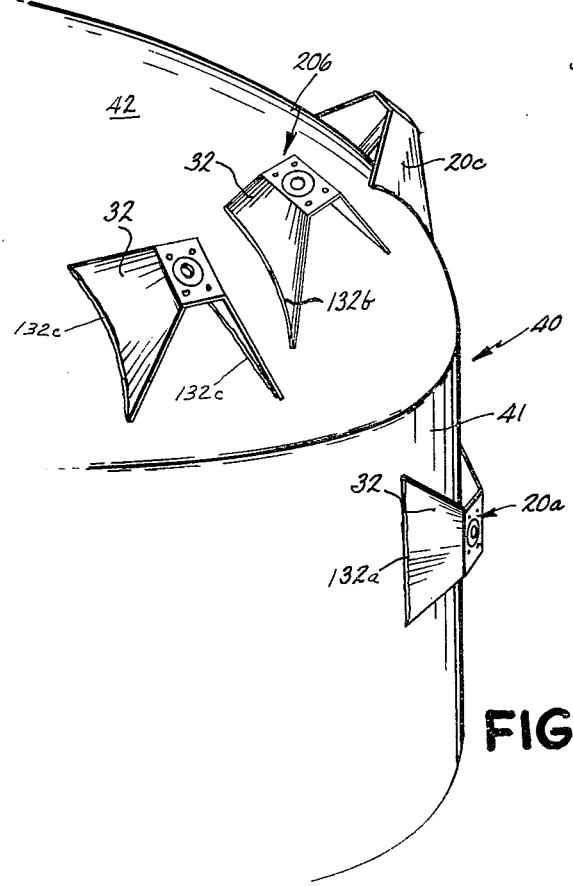
FIG. 6 is a perspective view of a fitment in accordance with an embodiment of this invention mounted at a plurality of positions on a tank wall.

FIG. 6 illustrates many different various ways and positions in which the fitment 20 can be mounted on storage vessels or tanks constructed of a resin material. It should be understood that any number of fittings can be attached to a tank or vessel. Concern should be exercised as to their location so that the reinforcement for one fitting does not interfere with the placement of the adjacent ones.

FIG. 6 discloses the fitments 20a, 20b and 20c, all of which are constructed as disclosed hereinabove. Fitment 20a is shown mounted on the cylindrical wall of the tank 40 having the cylindrical upright wall 41 and dome 42. In this application, the bottom edges 132a of the legs 32 form straight lines parallel to each other and to the axis of the cylinder. Thus, the legs 32 do not require any special cutting, forming or shaping to accommodate the wall 41 of the vessel or tank 40.

The fitment 20b is mounted on the dome 42 of the tank or vessel in a perpendicular fashion as differeng from the placement of fitment 20c by cutting away the ends of legs 32 to form the edges 132b which conform with the generally spherical shape of the dome.

Figure 3:
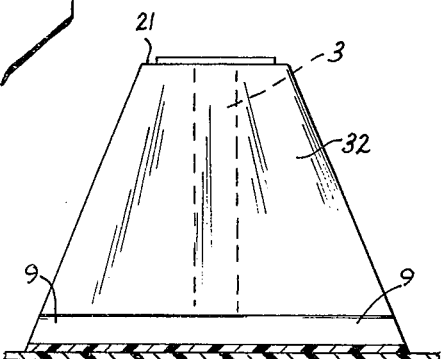
FIG. 3 is a side elevational view of the fitment.

As shown by fitment 20c, the fitment of this invention can be adapted for fitting on the dome 42 of a tank or vessel by cutting away the ends of the legs 32 to form the edges 132c which conform with the generally spherical shape of the dome. Further, if it is desired to mount the fitment on a flat topped tank or on any flat surface of the tank, the fitment can be mounted on the flat surface in the manner as shown by FIGS. 1, 2 and 3. It should be readily evident that the fitment of this invention is easily adaptable for mounting on any shaped surfaces by either forming or cutting away the ends of the legs 32 to conform with the shape or configuration of the surface. Such adaptability is accomplished without adversely affecting the strength of the fitment itself or the mounting strength of the fitment to the tank or vessel.

A fitment 20 in accordance with an embodiment of this invention having the typical thicknesses described and the construction described, has been tested to withstand overhung forces, that is, a force applied to a pipe perpendicular to the top surface of top wall 21, of 1500 pounds. Also, fitment 20 has withstood a twisting force of 2,000 pounds applied to top wall 21 by a plate bolted to top wall 21 in the plane of top wall 21.

The fitment of this invention is substantially superior to the prior art fitments such as that of U.S. Pat. No. 3,436,102 previously referred to. The present invention provides substantially easier access for mounting the fitment on a tank or vessel regardless of the configuration of the surface on which the fitment is to be mounted. This easier connection or mounting of the fitment to the tank is provided by the easy access to the pipe and the ease in which the legs can be formed or cut away to conform with the shape of the surface on which the fitment is to be mounted. The present fitment is easily adaptable to flat, curved or spherical surfaces. The fitment of this invention is substantially easier to attach to the areas which are to be bonded because of the ready accessibility of such areas as opposed to the fitment of U.S. Pat. No. 3,436,102. Further, the bolts and nuts for subsequent attachment of the hose flanges are easier to reach for insertion and wrench tightening.

The attachment welds are easily inspected as opposed to the prior art fitments. The unit is more sanitary since no pockets are provided to trap spillage and the easily accessible attachment surfaces are easier to clean. The geometry of the attachment fitting as disclosed specifically in FIG. 5 provides for better placement of reinforcing fibers thus providing a stronger fitment and a stronger mounting of the fitment to the tank. Further, this invention provides a reinforcement for the opening cut into the fibers of the fiber-reinforced resin tank, so that the stresses on the fiber structure are kept within allowable limits.

Another important advantage of this invention resides in the economics. It provides a more economical fitment while at the same time providing one that is satisfactorily strong not only in the construction of the fitment itself, but in the mounting of the same to a tank.

Also, the transfer of the forces imposed by an attachment to the fitment is better since the forces are transferred to the fibers or filaments of the tank wall within the limits of their capability. Other advantages of this invention are to provide a fitment that requires less labor to apply than those presently in use and to provide such a fitment which when applied, is easier to inspect for manufacturing defects, and after it is in use, easier to inspect for externally imposed damage. It should be evident from these advantages of the present inventiion that a substantial contribution to the art has been made by it.

Various modifications and variations will no doubt occur to those skilled in the art to which this invention pertains. For example, the particular size and position of the attachment holes and the relative angle of the supporting surfaces can be varied from that disclosed herein. These and all other variations which basically rely on the teachings through which this disclosure has advanced the art are properly considered within the scope of this invention and as defined by the appended claims.

The embodiments of the invention in which an exclusive property or privilege is claimed are defined as follows:

1. A fitment for a vessel wall having filaments and a bonding matrix for binding the filaments together, said fitment comprising:
   a top wall for receiving a flange of a hose or the like to be coupled to the vessel wall, said top wall having a pair of generally opposing rectilinear sides, said top wall having a pipe opening;
   a pair of generally planar, trapezoidally shaped support legs extending downwardly from said generally opposing sides to form an obtuse angle between said top wall and each of said legs and supporting said top wall at a position spaced from the vessel wall, the area between said legs being readily accessible and laterally bounded by substantially only said legs thereby facilitating connection of said support legs to the vessel wall and facilitating cleaning of the vessel wall and said fitment in the area between said legs; and
   a pipe means for carrying a substance from said pipe opening to the vessel wall and into the interior of the vessel, said pipe means being attached to said top wall at said pipe opening.

2. A fitment as recited in claim 1 wherein said top wall and said legs are an integral unit comprising layers of fabric reinforcement, with a resin matrix.

3. A fitment of claim 2 in which the layers comprise at least one each of a woven fabric having filaments generally crossing at about 90° and another woven fabric having filaments generally crossing at about 90° but being oriented generally at about 45° from the other layer.

4. The fitment of claim 3 in which the layers also comprise a top layer comprising a surfacing veil.

5. A fitment as recited in claim 3 further comprising a reinforcimg mat extending along the surface of the vessel wall from one leg to the other leg and sandwiched between the ends of said legs and the vessel for providing additional reinforcement around the opening in the vessel for said pipe means.

6. A fitment for a vessel wall having filaments and a bonding matrix for binding the filaments together, said fitment comprising:
a generally rectangular, planar top wall for receiving a flange of a hose or the like to be coupled to the vessel wall, said top wall having an opening;
a pair of generally planar legs extending from along substantially the entire length of opposing sides of said top wall, said legs extending away from said top wall and toward the vessel wall for supporting said top wall at a position spaced from the vessel wall, said legs increasing in width with increasing distance from said top wall so that a force applied to said legs adjacent said top wall is applied to the vessel wall along an increased area thus reducing the concentration of the applied force;
said top wall and legs being formed of a plurality of overlapping layers, each layer including the area of said top wall and the area of one of said legs, adjacent layers including the areas of opposing legs, all of sid layers having an opening therethrough within the area of said top wall; and
a generally cylindrical pipe for extending from said top wall to the vessel wall, said pipe extending through said opening in each of said overlapping layers and attached to said top wall.

7. A fitment for a vessel wall having filaments and a bonding matrix for binding the filaments together, said fitment comprising:
a generally rectangular, planar top wall for receiving a flange of a hose or the like to be coupled to the vessel wall, said top wall having an opening;
a pair of generally planar legs extending from along substantially the entire length of opposing sides of said top wall, said legs extending away from said top wall and toward the vessel wall for supporting said top wall at a position spaced from the vessel wall, said legs increasing in width with increasing distance from said top wall so that a force applied to said legs adjacent said top wall is applied to the vessel wall along an increased area thus reducing the concentration of the applied force;
said top wall and legs being formed of a plurality of overlapping layers, each layer including the area of said top wall and the area of one of said legs, adjacent layers including the areas of opposing legs, all of said layers having an opening therethrough within the area of said top wall;
a generally cylindrical pipe for extending from said top wall to the vessel wall, said pipe extending through said opening in each of said overlapping layers and attached to said top wall;
said overlapping layers comprising a pair of surfacing veils, each extending within the area of one of said legs and within the area of said top wall and covering a portion of the outwardly facing surfaces thereof;
at least a pair of woven fabric layers with filaments crossing at about 90° angles, each extending within the area of the one of said legs and within the area of said top wall;
at least another pair of woven fabric layers with filaments crossing at about 90° angles, each extending within the area of the legs and within the area of said top wall; said woven layers being oriented with the filaments of one pair of layers being arranged generally at about 45° from the filaments of the other pair of layers;
a plurality of reinforcement layers, each reinforcement layer extending within the area of one of said legs and within the area of said top wall and covering a portion of the inwardly facing surfaces thereof; and
said overlapping layers having slots in said top wall area for forming flaps which can fold apart while the fitment is being constructed to provide a sufficiently large opening to receive said pipe.

8. A fitment for a vessel wall having filaments and a bonding matrix for binding the filaments together, said fitment comprising:
a top wall for receiving a flange of a hose or the like to be coupled to the vessel wall, said top wall having a pair of generally opposing rectilinear sides, said top wall having a pipe opening;
a pair of generally planar support legs extending downwardly from said generally opposing sides to form an obtuse angle between said top wall and each of said legs and supporting said top wall at a position spaced from the vessel wall, the area between said legs being readily accessible and laterally bounded by substantially only said legs thereby facilitating connection of said support legs to the vessel wall and facilitating cleaning of the vessel wall and said fitment in the area between said legs;
a pipe means for carrying a substance from said pipe opening to the vessel wall and into the interior of the vessel, said pipe means being attached to said top wall at said pipe opening; and
said top wall having connection openings therethrough for receiving connecting means for attaching the fitting of a conduit or the like to said fitment, and said legs being spaced sufficiently far apart so there is easy access to the connecting means from the underside of said top wall thereby facilitating connection of the fitting of the conduit.

9. A fitment as recited in claim 5 wherein said top wall has a top surface with at least one raised, closed loop ridge for concentrating gasket pressure thereby improving the seal between a pipe attached to said filament.

10. A fitment as recited in claim 5 further comprising a generally planar flange attached to said top wall in the plane of said top wall for rigidifying said top wall.

11. A fitment as recited in claim 7 wherein said flange abuts the bottom surface of said top wall around said pipe means.

12. A fitment as recited in claim 7 wherein said flange is positioned within said top wall generally around said pipe means.

13. A fitment as recited in claim 5 further comprising a sealing means extending along the bottom inner and outer sides of the lower edges of said legs for providing a sanitary seal between said support surface and the vessel wall.

* * * * *